United States Patent Office 3,429,908
Patented Feb. 25, 1969

3,429,908
FLUORENE NUCLEUS DERIVATIVES OF POLYPHENYL COMPOUNDS
John J. van Venrooy, Wyncroft, Pa., assignor to Sun Oil Company, Philadelphia, Pa., a corporation of New Jersey
No Drawing. Filed Feb. 24, 1966, Ser. No. 529,630
U.S. Cl. 260—448  15 Claims
Int. Cl. C07f 5/06; C07c 15/00, 37/00

ABSTRACT OF THE DISCLOSURE

Aluminum tetrahalide complexes of 9-biphenylfluorene compounds are prepared by reacting (1) an unsubstituted polyphenyl with (2) a halogenated methane having at least three chlorine and/or bromine atoms and (3) $AlCl_3$ or $AlBr_3$. The complexes are useful as pH indicators and as intermediates in the preparation of 9-biphenylfluorene and derivatives thereof.

---

This invention pertains to the processing of polyphenyl compounds for purposes of developing industrially useful materials from aromatic hydrocarbons possessing the high inherent stability of the polyphenyl system.

For purposes of this specification and the claims the generic term "polyphenyl" is intended to define those aromatic hydrocarbons possessing a plurality of phenyl groups, that is at least two such groups, with adjacent groups being joined via one ring carbon atom of each phenyl group. Examples of such compounds are biphenyl, terphenyl, quaterphenyl, etc., and including those having a larger number of phenyl groups, such as reported in J.A.C.S., 85, pp. 454 et seq. (1963), and in J.O.C., 29, pp. 2416 et seq. (1954).

The invention is outstandingly useful for the production of polyarylmethyl halide-metal halide complexes possessing the 9-biphenylfluorene nucleus from which all manner of useful derivatives can be obtained.

For purposes of this specification and the claims the term "9-biphenylfluorene nucleus" is intended to define a nuclear structure as follows:

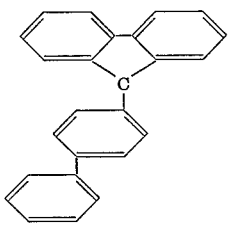

Among the highly useful compounds produced as a result of the use of such complexes are 9-biphenylfluorene and derivatives thereof, such as the hydroxy, alkoxy and halogen derivatives, and higher molecular weight compounds having within their respective structures the 9-biphenylfluorene nucleus. Besides being in turn chemical intermediates for the production of all manner of further derivatives, these products find outstanding use as pH indicators, both in and out of solution, as will hereinafter appear.

In the practice of the invention a polyphenyl compound is reacted with a halogenated methane (polyhaloalkane) having at least 3 chlorine and/or bromine atoms, in the presence of $AlCl_3$ or $AlBr_3$ as catalyst to produce initially a reaction complex with the catalyst from which a variety of reaction products can be derived. The reaction is normally carried out in the presence of a suitable diluent in which the polyphenyl may or may not be soluble, generally being insoluble in the case of polyphenyls of relatively high molecular weight. Diluents are, for practical purposes, inert in the reaction zone. $CS_2$ as diluent is found to be eminently satisfactory. Examples of other suitable diluents are o-dichlorobenzene, o-dibromobenzene, 1,1,2,2-tetrachloroethane, 1,1,2-trichlorotri-

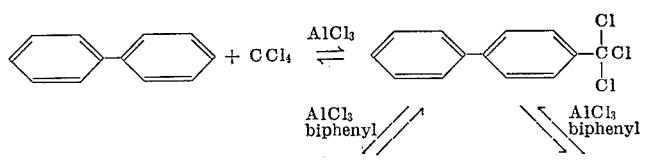

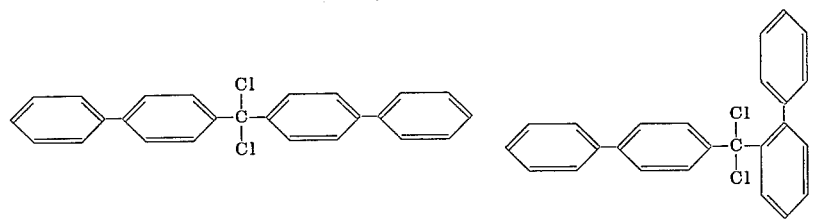

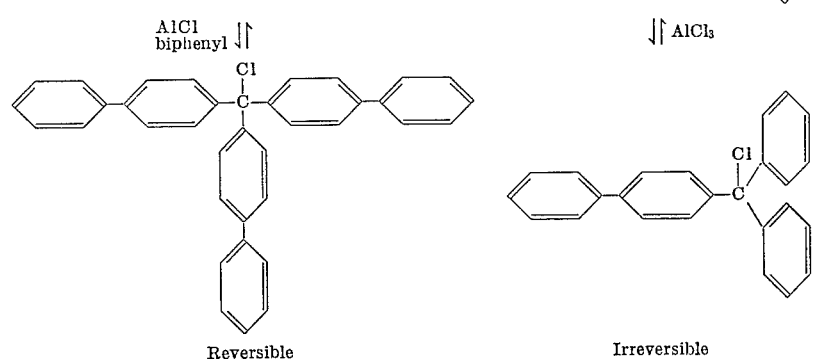

Reversible  Irreversible fluoroethane, m-dichlorobenzene and m-dibromobenzene.

As the halogenated methane CCl₄ and CBr₄ are found to be particularly useful.

The exact nature of the reaction has not been definitely established, but the above course is strongly indicated, and is shown by illustration with biphenyl and CCl₄, without indication of by-product HCl.

Evidence indicates that the reversible reaction shown at the left is predominant with respect to rate, especially when the polyphenyl is present in relatively high concentration. The irreversible reaction, although proceeding at a slower rate, yields the desired product in high percentage, this reaction being favored by dilute conditions in the reaction zone. Additional evidence for a stepwise alkylation mechanism is the formation of a small amount of biphenylbenzophenone formed by the hydrolysis of the dichlorodibiphenylmethane intermediate during the work-up procedure.

While for purposes of simplicity the product is shown in the above equation as the halogen derivative, it exists in the form of a triarylmethyl halide-metal halide complex, with ionic bonding as illustrated in the case of AlCl₃ as catalyst by the following formula:

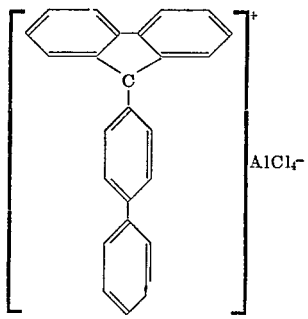

In the case of the use of AlBr₃ as catalyst in the practice of the invention, the corresponding anion will be present, as will immediately appear to those skilled in the art upon becoming familiar with the invention. Thus in the case of AlBr₃ as catalyst and CBr₄ as alkylation reactant, the anion becomes AlBr₄⁻. If a mixed alkylation system is employed such as CCl₄ and AlBr₃ the aluminum halide anion contains a mixture of both halides.

Generically, the ionically bonded complex of the present invention can be represented by means of the structural formula

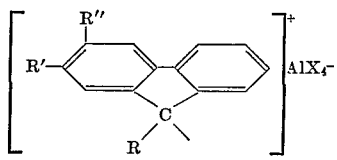

wherein X is chlorine or bromine, R' is hydrogen or phenyl, R" is hydrogen or phenyl, at least one of R' and R" being hydrogen and R is an unsubstituted polyphenyl radical, being biphenyl when both R' and R" are hydrogen, being meta-terphenyl when R" is phenyl and being para-terphenyl when R' is phenyl.

The nature of the anion is of minor importance for it is eliminated in subsequent reactions. The utility of the cation on the other hand is of outstanding importance.

The following examples are given by way of illustration.

Example 1

To a 3-neck flask was added 20 parts of CS₂ as solvent, 0.85 part of CCl₄, 1.25 parts of biphenyl, and 1.5 parts of AlCl₃, all parts being by weight. The AlCl₃ was added last and slowly. The flask was equipped with a stirrer and a water-cooled reflux condenser, the third neck of the flask being used for addition of ingredients, but otherwise kept closed. The reaction mixture turned dark blue with the precipitation of solids. Stirring was continued in excess of 2 hours at ambient temperature, whereupon the liquid present (CS₂) was separated by decantation from the semi-solid precipitate to yield ironically bonded triarylmethyl halide-metal halide complex as illustrated above.

To illustrate the utility of this complex in the production of the 9-hydroxyfluorene derivative, the complex was placed on cracked ice. Upon partial melting of the ice, the mixture was stirred and slowly warmed, whereupon dilute HCl was added to facilitate removal of aluminum salts by keeping them solubilized. The solid granules were then separated by filtration, washed with water, treated with dilute (10% by weight) NaOH, then with dilute (1% by weight) HCl, and finally washed with water. The solid reaction product upon drying consisted of 1.35 parts of pink powder of which approximately 90% was extracted with acetone to yield technical grade 9-biphenyl-9-hydroxyfluorene, a white powder.

As brought out above, the precipitate before contact with water is comprised of 9-biphenyl-9-chlorofluorene existing in the form of a complex with the catalyst, which complex upon reaction with water yields the above-mentioned 9-biphenyl-9-hydroxyfluorene having the formula:

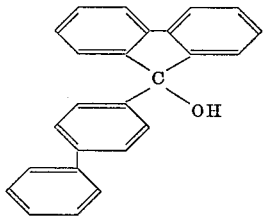

The above structure was confirmed by the use of procedures or apparatus as follows: melting point, nuclear magnetic resonance, ultraviolet spectrometer, mass spectrometer, and in addition by placing the product in concentrated H₂SO₄, it being a characteristic of compounds produced by the invention to turn an intense deep blue color under such circumstances. This is due to the formation of the corresponding carbonium ion.

Example 2

A series of experiments was performed in which in the production of the complex the ratio of catalyst to biphenyl was varied, all other conditions remaining the same. The molar ratio of AlCl₃ to biphenyl was as follows: 0.28, 0.55, 1.0, 1.4, and 2.8. Upon working up the products into the 9-hydroxy derivative as in Example 1 and purifying the same by acetone extraction, the weight percent yields based on the biphenyl charge were 36%, 39%, 74%, 84% and 78% respectively. These data indicate that use of excess catalyst in the production of the complex is not gainful, and a plot of the data on the purified hydroxy derivative indicates that the preferred molecular ratio range of AlCl₃ to biphenyl is between about 1.5 to 2.0.

Example 3

Crude solid granular 9-biphenyl-9-hydroxyfluorene obtained as in Example 1 was treated with an excess of CH₃OH in a beaker with warming. The solid upon going into solution in the alcohol, reacted therewith. Upon removal of solid unreacted material by filtering, the liquid was decolorized with carbon black, filtered, and then subjected to evaporation to remove the remaining alcohol present. The solid white product was 9-(4-biphenyl)-9-methoxyfluorene having the formula:

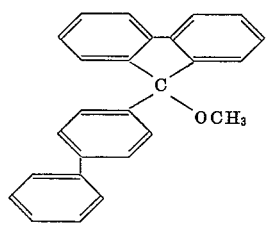

The above structure was confirmed by the use of procedures of apparatus as follows: ultraviolet spectrometer, mass spectrometer, melting point, nuclear magnetic resonance, carbon, hydrogen and oxygen analysis, and by the deep blue color when placed in $H_2SO_4$.

Example 4

In this example ethyl alcohol was substituted for methyl alcohol in procedure similar to that of Example 3 to yield the corresponding ethyl ether derivative.

Identification of structure was by the use of procedures or apparatus as follows: mass spectrometer, nuclear magnetic resonance, and melting point; also by the development of a deep blue color when the white granular product was placed in concentrated $H_2SO_4$.

A preferred method of preparing ether derivatives is to place the hydroxy reaction product of Example 1, crude or refined in a Soxhlet extractor, using an aliphatic alcohol in excess as reactant and solvent for the solid reactant, and refluxing until no more of the solid goes into solution. The liquid phase comprising the reaction product in solution in the excess solvent is then filtered off and subjected to vaporization conditions, e.g., distillation, after desired decolorization or other purification treatment, to yield the ether derivative corresponding to the alcohol employed.

For preparing the ethers according to the invention, preferred alcohols, quite apart from solubility characteristics, are the saturated monohydroxyaliphatic alcohols, e.g., methyl, ethyl, propyl, butyl and amyl alcohols, including isomeric forms, as well as saturated aliphatic dihydroxy alcohols, e.g., ethylene glycol, propylene glycol, etc.

An alternate method for the preparation of these ether derivatives is to substitute the desired alcohol in place of ice in the procedure of Example 1 for the production of the hydroxy derivative, to obtain the ether derivatives directly from the complex, without intermediate production of the hydroxy derivative.

Example 5

Complex obtained such as in Example 1 was treated with $C_2H_5OH$. This led to the formation of a light blue powder, the major part of which was soluble in $C_2H_5OH$ upon warming. Excess alcohol was then removed from the reaction mass to yield a blue powder. This powder was treated with dilute (1%) HCl to remove catalyst residues. Upon removal of treating liquid and drying, the material became a light pink powder. The latter powder showed the characteristic infrared spectra of the 9-ethoxy-9-(4-biphenyl)fluorene, but with additional bands due to impurities. After treatment with a suspension of carbon black in ethanol, filtering, and crystallization, a purified white crystalline product was obtained, which was identified as 9-ethoxy-9-(4-biphenyl)fluorene. Identification was by infrared spectra, nuclear magnetic resonance, melting point, and development of the characteristic deep blue color in $H_2SO_4$.

Example 6

In this example the procedure of Example 1 for the production of the complex was followed, except that $CHCl_3$ was substituted for $CCl_4$. The reaction rate was considerably reduced leaving unreacted biphenyl in considerable amount. The crude solid product, after decantation of solvent with unreacted biphenyl in solution was stirred with partially melted cracked ice. The mass was then treated with benzene whereupon about 50% of the solid product went into solution. Upon removal of benzene from the solution following its separation a white powder was obtained which turned deep blue in $H_2SO_4$. These benzene solubles were subjected to elution chromatography using acid-washed alumina and a petroleum ether-benzene solvent.

A column cut was taken for which a mass spectrometer analysis showed a major peak at 318 m/e units. This is the mass number of 9-(4-biphenyl)fluorene having the formula:

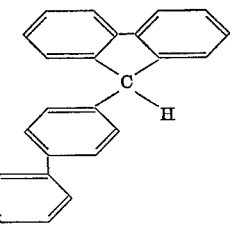

The next cut off the column showed a major peak at 334 which indicates 9-(4-biphenyl)-9-hydroxyfluorene. Both cuts turned deep blue in $H_2SO_4$.

These data show that $CHCl_3$ reacts, but not as efficiently as $CCl_4$. They also show that the protonic form depicted above is subjected to hydrolysis in the work up to yield the alcohol.

Example 7

This reaction for the production of complex was carried out by procedure similar to that of Example 1, but with a charge of 1.9 parts meta-terphenyl, 0.85 part $CCl_4$, 20 parts $CS_2$ as solvent, and 1.5 parts $AlCl_3$ as catalyst, all parts being by weight. A major part of the meta-terphenyl remained unreacted under the conditions of reaction (ambient temperature) and was removed with the solvent by decantation.

The solid polyarylmethylhalide-metal halide complex thus obtained was reacted following the procedure of Example 1 including final washing with water to yield the hydroxy derivative, a white powder amounting to 0.61 part by weight. This product was refluxed in a Soxhlet extractor with $CH_3OH$. The resulting solid was removed from the extraction thimble, washed and dried, yielding a white powder. Analysis of the latter material by the nuclear magnetic resonance method showed the $OCH_3$ band, and an $OCH_3$:ArH proton ratio of 5:27 as compared to a theoretical ratio of 3:25. It also turned deep blue when placed in concentrated $H_2SO_4$, which is a characteristic of all of the products produced by the invention, whether soluble or insoluble in the environmental media. These data indicate that a compound containing the fluorene ring was formed having the formula:

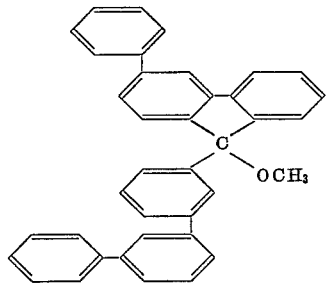

9-(4-1,1':3',1''-terphenyl)-9-methoxy-6-phenylfluorene.

An alternate structure is possible, namely, with the phenyl substituent on the fluorene group attached in the 8-position instead of the 6-position, but this is unlikely due to steric effects.

In a repeat run with 2.55 parts $CCl_4$ instead of 0.85 part, all other conditions remaining the same, the yield of solid white product was raised to one part from the 0.61 part mentioned above.

Example 8

This run was similar to that of Example 7 except that para-terphenyl was substituted for meta-terphenyl. The para-terphenyl proved to have a very low solubility in $CS_2$. The small undissolved crystals upon separation from the reaction mass were nevertheless treated the same as the complex was reacted in Example 1, by placing them on cracked ice, etc., and including final washing with water, to yield a white granular product. The latter product was found to turn a deep blue when placed in concentrated H₂SO₄. This shows that reaction took place on the surfaces of the crystals to form the hydroxy derivative. Unreacted para-terphenyl shows no color development when placed in concentrated H₂SO₄.

Example 9

In this run a large ratio of solvent to reactants was employed, the charge comprising 252 parts CS₂, 1.9 parts para-terphenyl, 0.85 part CCl₄, and 1.5 parts AlCl₃, all parts being by weight. The reaction was conducted similarly to that employed in Example 1. A part of the para-terphenyl remained unreacted under the conditions of reaction (ambient temperature), and was removed with the solvent from the solid reaction product by decantation, it being in solution in view of the large ratio of solvent present. After the work up of the separated solid complex with the hydroxy-forming procedure of Example 1, including treatment with cracked ice, NaOH, HCl, and water washing, 0.9 part of solid reaction product was obtained, an off-white powder which developed a deep blue color when placed in concentrated H₂SO₄. This indicates the production of 9-(4-1,1':4',1''-terphenyl)-9-hydroxy-7-phenylfluorene.

Example 10

In this run the charge was 20 parts CS₂, 1.9 parts para-hexaphenyl, 0.85 part CCl₄, and 1.5 parts AlCl₃, all parts being by weight. The para-hexaphenyl was obtained by the method described in J.O.C., 29, pp. 2416 et seq. (1964). Reaction conditions for the production of the complex were similar to those of Example 1. The granular charge material after reaction and upon separation from CS₂ was treated the same as the complex in Example 1, including treatment with cracked ice, NaOH, HCl and final washing with water, to yield 1.62 parts of solid light tan powder. Very little of the granular para-hexaphenyl went into solution under the conditions of reaction, but reaction nevertheless took place on the surfaces thereof to form the hydroxy derivative, as shown by the fact that the treated granules turned a deep blue when placed in concentrated H₂SO₄. This is not the case with unreacted para-hexaphenyl.

Example 11

In this run para-polyphenyl obtained by the method reported in J.A.C.S. 85, pp. 454 et seq. (1963) was reacted. The charge was 1.9 parts para-polyphenyl, 0.85 part CCl₄, 20 parts CS₂, and 1.5 parts AlCl₃, all parts being by weight. Reaction conditions for the production of the complex were similar to those of Example 1. As in Example 10, very little, if any, of the para-polyphenyl went into solution under the conditions of the reaction, but reaction nevertheless took place on the surfaces of the granules. Upon separation of the granules from the CS₂, they were worked up the same as the complex in Example 1 to yield a solid product coated with the hydroxy derivative, 1.9 parts of which were recovered. This product, tan in color, turned a deep blue when placed in concentrated H₂SO₄, whereas the unreacted charge material produces no change in color when similarly placed.

Example 12

To an Erlenmeyer flask were added 31 parts of CS₂ as solvent, 0.7 part of CCl₄, 1.5 parts of biphenyl, and 5.4 parts of AlBr₃, all parts being by weight. The AlBr₃ was added last and slowly. The Erlenmeyer flask was stirred with a glass rod. The reaction mixture turned dark blue with the precipitation of solids. Stirring was continued for a period of two hours at ambient temperature, whereupon the liquid present (CS₂) was evaporated away under a stream of nitrogen to yield ionically bonded triarylmethyl halide-metal halide complex.

The complex was placed on cracked ice. Upon partial melting of the ice, the mixture was stirred and slowly warmed whereupon dilute HCl was added to facilitate removal of aluminum salts by keeping them solubilized. The solid granules after separation by filtration were then treated with dilute (10% by weight) NaOH, then with dilute (1% by weight) HCl, and finally were washed with water and dried.

The solid granular material thus obtained and comprising the hydroxy derivative was treated with an excess of ethanol in a beaker with warming. The solid upon going into solution in the alcohol, reacted therewith. Upon removal of solid unreacted material by filtering, the liquid was decolorized with carbon black, filtered and then subjected to evaporation to remove the remaining alcohol. The solid white product was 9-(4-biphenyl)-9-ethoxyfluorene having the formula:

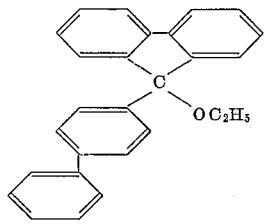

Example 13

Complex obtained as in Example 1 was treated in a beaker with chilled ethylene glycol. The mixture was stirred vigorously and slowly warmed whereupon a pink oil floated to the surface. The contents of the beaker were diluted with a large amount of water and extracted with diethylether. The ether extract was evaporated yielding a solid material having a pink color. This solid pink material was subjected to elution chromatography using acid-washed alumina and a 25% benzene, 75% n-heptane solvent.

The first product off the column was a white crystalline solid having the formula:

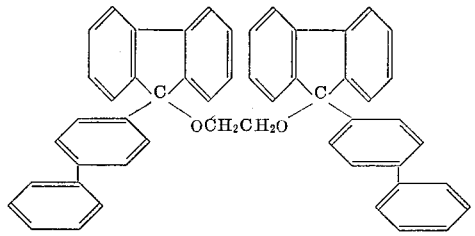

The above structure was confirmed by the use of procedures or apparatus as follows: melting point, nuclear magnetic resonance, infrared spectroscopy, osmometry and by the deep blue color when placed in concentrated sulfuric acid.

Example 14

To an Erlenmeyer flask was charged 31 parts of CS₂ as solvent, 1.65 parts of CBr₄, 1.5 parts of biphenyl, and 2.66 parts of AlCl₃, all parts being by weight. The AlCl₃ was added last and slowly. The Erlenmeyer flask was stirred with a glass rod. The reaction mixture turned dark blue with the precipitation of solids. Stirring was continued for a period of two hours at ambient temperature, whereupon the liquid present (CS₂) was evaporated away under a stream of nitrogen to yield ionically bonded triarylmethyl halide-metal halide complex.

The complex was placed on cracked ice. Upon partial melting of the ice, the mixture was stirred and slowly warmed whereupon dilute HCl was added to facilitate the removal of aluminum salts by keeping them solubilized. The solid granules after separation were then treated with dilute (10% by weight) NaOH, then with dilute (1% by weight) HCl, and finally washed with water and dried. The crude product was pink in color and amounted to 1.6 parts of crude 9-(4-biphenyl)-9-hydroxyfluorene.

The latter solid granular material was treated with an excess of ethanol in a beaker with warming. The solid upon going into solution in the alcohol reacted therewith.

Upon removal of solid unreacted material by filtering, the liquid was decolorized with carbon black, filtered and then subjected to evaporation to remove the remaining alcohol. The solid white product amounted to 1.2 parts and was identical to the 9-(4-biphenyl)-9-ethoxyfluorene prepared using CCl₄ as the alkylating agent. Identification was made by the use of infrared spectroscopy and by the deep blue color when placed in concentrated sulfuric acid.

From the foregoing it can be seen that highly useful polyarylmethylhalide-metal halide complexes possessing the 9-biphenylfluorene nucleus are produced which in turn are capable of reaction with a variety of reactants, e.g., those containing an OH group or a plurality thereof. These complexes, solids in nature, are stable and ready for use even without purification treatment. Normally the solvent or other diluent will be removed therefrom by decantation, filtration or other suitable separation procedures. Other reactants for reaction with these complexes are alkyl ethers to produce corresponding ether derivatives, acetyl halides, e.g., acetyl chloride, to produce the corresponding halide derivative, sulfuric acid to produce the corresponding polyarylcarbonium bisulfate, etc. Compounds containing an SH group or a plurality thereof, e.g., alkyl mercaptans also react.

The complex products of the present invention as well as products that can be made therefrom are useful as pH indicators, since they exhibit color changes at a specific acid strength. For example the 9-(4-biphenyl)-9-methoxyfluorene is normally a white crystalline solid but becomes blue when exposed to an environment having an acid strength above 55–62% $H_2SO_4$ equivalent. Such acid strength can be determined by comparison techniques with the standardized indicator system reported by Hirschler in the Journal of Catalysts, vol. 2, No. 5, October 1963, pages 428–439. Many other uses will become apparent to persons skilled in the art upon becoming familiar herewith.

Although, and except as otherwise noted, the reactions of the above examples were conducted at room temperature and under atmospheric pressure, it is to be understood that other temperatures and pressures can be employed, neither being found to be particularly critical. While anhydrous conditions in the production of the complex are preferred, such conditions have not been found to be essential, for considerable latitude in the presence of moisture can be tolerated.

Diluent is employed in the reaction for the production of the complex in part to obtain a mass that can be agitated or stirred, and also in case the reactants are soluble in the diluent, to facilitate reaction. The ratio of diluent is not found to be extremely critical, but as indicated above substantial dilution is preferred, such as between 1 and 100 parts of solvent per part of total reactants. Care should be exercised in the selection of diluent for the desired reaction to take place, the diluents named above being eminently suitable for the purpose.

Experimentation reveals the fact that the use of $AlCl_3$ and/or $AlBr_3$ is critical to the reaction, for other Friedel-Crafts catalysts, such as $FeCl_3$, $SnCl_4$, $SbCl_5$, $BF_3$, $BF_3 \cdot HF$, $TiCl_4$, $ZnCl_2$ and $BF_3 \cdot O(C_2H_5)_2$ have proved to be unsatisfactory.

I claim:
1. A process for producing an aluminum tetrahalide complex of a 9-biphenylfluorene compound comprising reacting an unsubstituted polyphenyl with (1) a polyhaloalkane which is a halogenated methane having at least three chlorine and/or bromine atoms and (2) $AlCl_3$ or $AlBr_3$.
2. The process of claim 1 wherein the reaction is carried out in the presence of a diluent comprising carbon disulfide, o-dichlorobenzene, m-dichlorobenzene, 1,1,2,2-tetrachloroethane, 1,1,2 - trichlorotrifluoroethane, o-dibromobenzene or m-dibromobenzene.
3. The process of claim 2 wherein the halogenated methane is $CCl_4$ or $CBr_4$.
4. The process of claim 3 wherein the polyphenyl has no more than 6 phenyl groups.
5. The process of claim 4 wherein the polyphenyl has no more than 3 phenyl groups.
6. The process of claim 5 wherein the polyphenyl is biphenyl.
7. The process of claim 1 wherein the complex obtained in claim 1 is thereafter treated with a hydroxylating agent.
8. The process of claim 7 wherein the product obtained in claim 7 is thereafter treated with an ether-forming agent.
9. The process of claim 8 wherein the ether-forming agent is a saturated aliphatic alcohol having no more than two hydroxyl groups.
10. The process of claim 1 wherein the complex obtained in claim 1 is thereafter treated with an ether-forming agent.
11. The process of claim 10 wherein the ether-forming agent is a saturated aliphatic alcohol having no more than two hydroxyl groups.
12. An ionically bonded complex of the structural formula

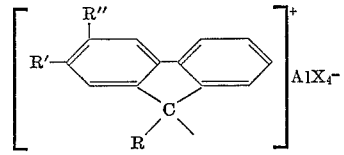

wherein X is chlorine or bromine, R' is hydrogen or phenyl, R" is hydrogen or phenyl, at least one of R' and R" being hydrogen and R is an unsubstituted polyphenyl radical, being biphenyl when both R' and R" are hydrogen, being meta-terphenyl when R" is phenyl and being para-terphenyl when R' is phenyl.
13. The complex of claim 12 wherein R is biphenyl and R', R" are each hydrogen.
14. The complex according to claim 12 wherein R' is a phenyl group.
15. The complex according to claim 12 wherein R" is a phenyl group.

References Cited

Thomas: "Anhydrous Aluminum Chloride in Organic Chemistry" (Reinhold Pub. Corp., 1941) p. 110.

TOBIAS E. LEVOW, *Primary Examiner.*

U.S. Cl. X.R.

260—618, 649, 668, 671, 611; 252—408; 23—230